Figure 1:
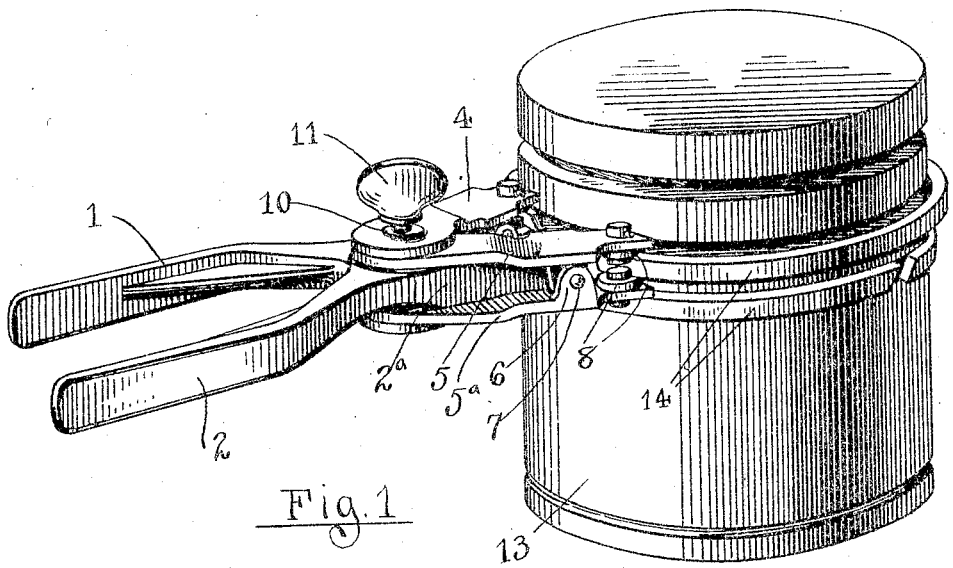

D. J. CAMPBELL.
PISTON RING PLIERS.
APPLICATION FILED MAR. 15, 1913.

1,153,674.   Patented Sept. 14, 1915.

Witnesses
Harold O. Van Antwerp
Palmer A. Jones

Inventor
Donald J. Campbell
By Luther V. Moulton
Attorney

UNITED STATES PATENT OFFICE.

DONALD J. CAMPBELL, OF MUSKEGON, MICHIGAN.

PISTON-RING PLIERS.

1,153,674.   Specification of Letters Patent.   Patented Sept. 14, 1915.

Application filed March 15, 1913. Serial No. 754,454.

*To all whom it may concern:*

Be it known that I, DONALD J. CAMPBELL, a citizen of the United States of America, residing at Muskegon, in the county of Muskegon and State of Michigan, have invented certain new and useful Improvements in Piston-Ring Pliers; and I do hereby declare the following to be a full, clear, and exact description of the invention, such as will enable others skilled in the art to which it appertains to make and use the same.

My invention relates to improvements in piston ring pliers and its object is to provide a tool by which the metal ring used on pistons may be easily and quickly removed and to so construct this tool that it will be simple and effective in operation, substantially made and cheaply produced, and to provide the device with certain other new and useful features hereinafter more fully described and particularly pointed out in the claims.

It is common practice to use on pistons such as are used in internal combustion engines, etc., one or more metallic packing rings which are loosely retained by their inherent spring tension in annular grooves provided in the periphery of such pistons, such rings being divided at one point, and when the piston is removed from its cylinder and the ring normally expanded, such rings are of a greater diameter than the piston and the bore of the cylinder, so that when thus normally expanded they will project outside of the grooves in the piston. Such rings do not, however, normally expand sufficiently to permit them to be removed from their grooves except by being further expanded by separating their divided ends to enlarge their diameter, but when so expanded and held in such expanded condition they may be readily slipped off from the piston.

According to the present practice the removal of piston rings is a difficult and tedious task, for that it is necessary to pry the divided ends of the ring out of the groove, and then insert pieces of thin metal under the ends, and slide these thin pieces circumferentially around the piston and under the ring and then slip the ring off the piston while it is thus held expanded by the thin pieces of metal. This operation results in a great waste of time, and the breakage of a considerable percentage of rings because of uneven and over expansion in their removal from the piston.

My invention provides a tool in the form of pliers, the jaws of which are adapted to separate as the handle members are brought together and said jaws are provided with means for gripping the ends of the divided piston ring, and by attaching these jaws, by means of the gripping means provided, to the ends of the said piston ring and compressing the handle members, the said ring is caused to spread and circumferentially expand and thus enlarge its diameter so that it may be easily held thus expanded and removed from the piston.

Figure 2:
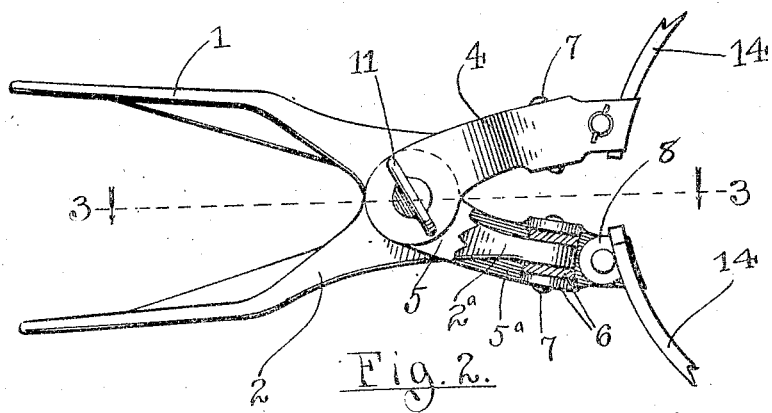
Figure 3:
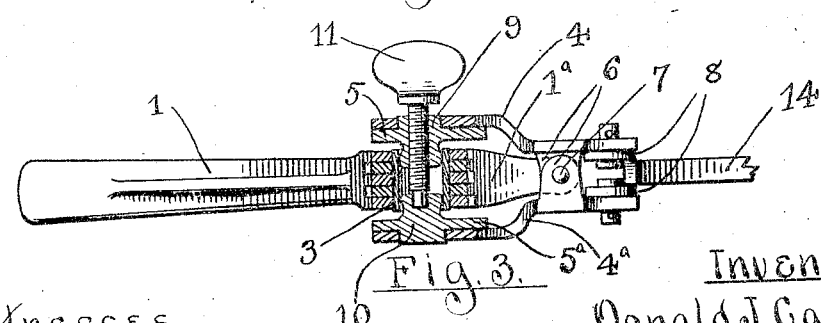

The preferred construction and arrangement of my improved pliers is clearly illustrated in the accompanying drawings, in which:

Figure 1 is a perspective view of the piston ring plier shown in operative position; Fig. 2 is a plan view of the same with a portion broken away to show details of construction; and, Fig. 3 is a vertical section on the line 3—3 of Fig. 2.

Like numbers refer to like parts in all of the figures.

1 and 2 represent the levers forming the pliers and these levers are pivotally connected together at a point between their ends, a tubular pivot bolt 3 is used for connecting the said levers. The lower ends of the levers 1 and 2 serve as the handle members of the tool, and the shorter ends $1^a$ and $2^a$ form the jaws of the same.

The jaw $1^a$, is provided with a co-acting pair of gripping levers 4, and $4^a$, which are adapted to grip in a line at a right angle to the movement of the jaw $1^a$, and the jaw $2^a$ is also provided with a like pair of gripping levers 5 and $5^a$, adapted to operate in like manner. Each of said levers is provided with ears 6, by means of which the levers 4 and $4^a$, are fulcrumed on a pivot 7 on the jaw $1^a$, and held in operative position thereon, and the levers 5 and $5^a$, are in like manner mounted and fulcrumed on the jaws $2^a$.

The forward ends of the clamping levers 4, $4^a$, 5 and $5^a$ are provided on their inner surfaces with hardened metallic blocks 8, preferably disk shaped and rotatably mounted on said levers, these blocks being adapted to engage the edges of the piston rings and clamp the same therebetween. The opposite ends of said clamping levers 4, 4ᵃ, 5 and 5ᵃ extend rearwardly, and overlap the tubular pivot bolt 3 at opposite sides of the pliers, the lever 4 overlaps the lever 5 on one side, and the lever 4ᵃ overlaps the lever 5ᵃ at the opposite side.

Fixed on the lever 5 is a member 9 which forms a pivot joint with the lever 4. This member 9 is axially screw-threaded to receive the thumb screw 11. Fixed on the lever 5ᵃ is a member 10, which forms a pivot joint with the lever 4ᵃ. The thumb screw 11 is adapted to be screwed through the member 9 and extends through the tubular pivot bolt 3, to engage the member 10.

The operation of the device is as follows: When the piston 13, is removed from its cylinder, the piston rings 14 will expand sufficiently to allow their divided ends to project beyond the periphery of the piston 13. In using the piston ring pliers, the operator separates the handle members 1 and 2 and the ends of the jaws 1ᵃ and 2ᵃ are thus brought together, the pliers are then placed so that the gripping levers 4 and 4ᵃ will be in position to grip one of the divided ends of the piston ring between the hardened blocks 8 mounted thereon, and the gripping levers 5 and 5ᵃ will, in like manner, be in position to grip the other end of the divided piston ring. With the pliers in this position, by screwing the thumb screw 11, through the member 9, and into forcible engagement with the member 10, these ends of the gripping levers 4, 4ᵃ, 5 and 5ᵃ, will all simultaneously be forced apart, and through the fulcrum on the pivots 7, the opposite ends of said levers will be forcibly brought together, thus gripping the edges of the two ends of the divided piston ring, respectively between the jaw ends of the levers 4 and 4ᵃ, and the jaws 5 and 5ᵃ. Now by bringing the handle members 1 and 2 of the pliers together the jaws 1ᵃ and 2ᵃ will be separated, and thus the piston ring will be sufficiently expanded and held thus expanded, so that it may be easily carried over the circumference of the piston 13. As the jaws of the pliers are separated their angular relation to the ends of the piston ring change, but the blocks 8 will rotate to accommodate this altered angular relation.

What I claim is:—

1. Piston ring pliers comprising a pair of levers pivoted together between their ends, the ends of the levers on one side of the pivot serving as jaw members of the pliers and the other ends thereof serving as handle members, a pair of gripping levers provided on each of the jaws and pivotally connected thereto, and means for separating the rear ends of said gripping levers to cause their forward ends to grip a piston ring therebetween.

2. Piston ring pliers comprising a pair of levers pivoted together between their ends, the ends of said levers on one side of the pivot forming the jaws of the pliers, while the opposite ends thereof serve as the handle members of the same, a pair of gripping levers on each jaw pivotally connected between their ends to the respective ends of the jaws, the rearwardly extending ends of said gripping levers overlapping the pivot of the pliers, and means for separating the rear ends of each respective pair of gripping levers to cause their forward ends to grip a piston ring.

3. Piston ring pliers comprising a pair of levers pivoted together between their ends, the pivot bolt for such connection being tubular, the ends of the levers on one side of the pivot forming the jaws of the pliers while the opposite ends form the handle members thereof, a pair of gripping levers provided for each jaw of the pliers, each pair of levers being pivotally connected between their ends to the respective ends of the jaws and having their rearwardly extending ends overlapping the tubular pivot bolt of the pliers, the ends of one pair of levers embracing the pliers and the ends of the opposite pair of levers embracing the first named levers, a screw thread in the end of one of the first named levers, and a thumb screw extending therethrough, and also adapted to engage the inner lever at the opposite side of the pliers.

4. Piston ring pliers comprising a pair of levers pivotally connected between their ends, the ends of the levers on one side of the pivot forming the jaws of the pliers and the opposite ends of the levers forming the handle members of the same, a pair of gripping levers provided for each jaw and pivotally connected between their ends to the end of the same, a gripping block rotatably mounted on the inner surface of the forward end of each gripping lever, and means for separating the rear ends of each respective pair of gripping levers.

5. Piston ring pliers comprising a pair of levers pivoted together between their ends, the ends of the levers on one side of the pivot forming the jaws of the pliers, and the opposite ends of the levers from the handle members thereof, the ends of said jaws being adapted to separate as the handle members are brought together, a pair of gripping levers provided for each jaw and pivotally connected between the ends to their respective jaws, a gripping block rotatively mounted on the inner surface of each gripping lever, and means for separating the rear ends of each respective pair of gripping levers.

6. Piston ring pliers comprising a pair of levers pivotally connected together between their ends, the pivot bolt of said connection being tubular, and the ends of the levers at one side of the pivot forming the jaws of the pliers, and the opposite ends of the levers forming the handle members of the same, said jaws being adapted to separate as the handle members are moved toward each other, a pair of gripping levers provided for each jaw and pivotally connected to the same, the rearwardly extending ends of each pair of said levers embracing the pivot bolt of the pliers, the said ends of one pair of gripping levers overlapping the like ends of the other pair of said levers, a screw threaded opening in the end of one of the inner levers, a thumb screw in said opening extending through the tubular pivot bolt and engaging the end of the opposite inner lever, and a gripping block rotatably mounted on the forward end of each gripping lever.

In testimony whereof I affix my signature in presence of two witnesses.

DONALD J. CAMPBELL.

Witnesses:
PALMER A. JONES,
HAROLD O. VAN ANTWERP.